Patented July 27, 1943

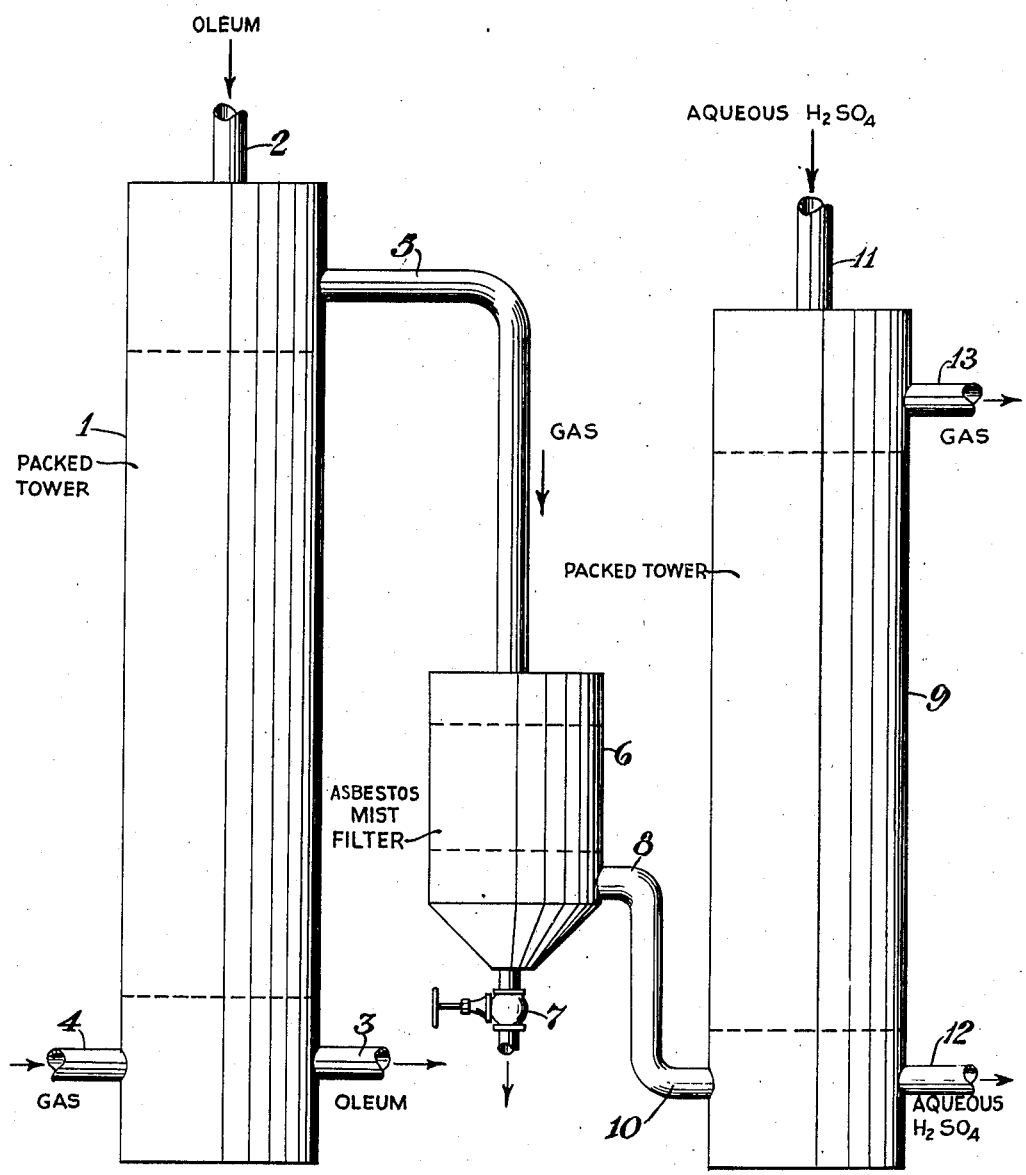

2,325,066

UNITED STATES PATENT OFFICE 2,325,066

REMOVAL OF NITROGEN OXIDE FROM GASES

Louis Joseph Marcotte, Woodbury, N. J., assignor to E. I. du Pont de Nemours & Company, Wilmington, Del., a corporation of Delaware Application December 31, 1941, Serial No. 425,061

4 Claims. (Cl. 23—178)

This invention relates to the selective absorption and removal of nitrogen oxides from gases containing the same, and, more particularly, it relates to the removal of nitrogen oxides from combustion gases. Still more particularly, it relates to the removal of nitrogen oxides from furnace gases rich in sulfur dioxide such as those emanating from a furnace using sulfur as the fuel.

It is frequently desirable to remove nitrogen oxides from gases containing the same and particularly to remove the oxides of nitrogen from the gaseous products of combustion. This is especially true where sulfur is burned to produce sulfur dioxide. In the prior art, attempts have been made to remove nitric oxide and higher oxides of nitrogen by the use of such adsorbants as activated charcoal, silica gel, copper turnings, etc. None of these known processes completely remove the nitrogen oxides, and these known adsorbants soon become saturated which necessitates stopping the process and renewing the adsorbants.

It is an object of this invention to provide a process for the complete removal of nitrogen oxides (nitric oxide and higher oxides of nitrogen) from the mixture with other gases. Another object is to provide a process for completely removing such nitrogen oxides from combustion gases. A further object is a process for the removal of such nitrogen oxides from combustion gases from furnaces using sulfur as a fuel. A still further object is to provide a process of this type which can be operated continuously over long periods of time. Other objects will appear hereinafter.

These objects have now been accomplished by contacting gases containing nitrogen oxide (nitric oxide and higher oxides of nitrogen) with sulfuric anhydride and removing the solid addition compound thus produced by passing the gas stream through a suitable filter.

In the accompanying drawing, the single figure is an elevation of one type of apparatus suitable for carrying out the process of the invention.

Referring more particularly to the drawing: 1 is a pack tower of suitable size. The packing may consist of copper, glass rings, carborundum, chain or other materials suitable for packing in columns which will stand the corrosive action of fuming sulfuric acid. Fuming sulfuric acid is introduced into the tower at 2 and passes down through the tower, being spread by the packing so as to offer a large contact surface. The fuming sulfuric acid or oleum leaves the tower near the bottom at 3. The gas to be purified is introduced into the tower near the bottom thereof at 4 and passes upward in countercurrent flow to the oleum. The nitrogen oxides react with sulfuric anhydride of the oleum to form a compound of the formula $(SO_3)_2NO$. This compound is a white solid having a melting point between 180° C. and 200° C. It forms as a white powder in the gas stream which leaves first tower 1 at 5. The gas stream is then passed through an asbestos mist filter 6. This filters the gases and retains substantially all of the addition compound of the nitrogen oxides with sulfuric anhydride and, in addition, removes most (95 per cent) of the sulfuric anhydride mist which is carried over by the gas stream. The condensed mist may be removed at intervals by opening valve 7. The purified gas stream leaves the filter at 8 and enters the second tower 9 at 10. This second tower is similar in design to tower 1, and the packing may be any material which will afford a large contact surface and which is resistant to the action of sulfuric acid. Ninety-eight per cent (98%) sulfuric acid is introduced into tower 9 at 11 and flows downward over the packing, leaving the tower at 12. The purified gas entering tower 9 at 10 passes upward in countercurrent flow to the aqueous solution of sulfuric acid and leaves the tower at 13. The aqueous sulfuric acid removes from the gas the residual sulfuric acid mist which remains therein after passing through filter 6.

In order that the process may be more fully understood, the following examples are given as illustrations of the invention. The invention is not limited to such examples, however, but suitable variations in the process can be made as will become apparent hereinafter.

EXAMPLE I

Furnace gas rich in sulfur dioxide containing varying small amounts of oxides of nitrogen was continually passed through a tower containing 20 per cent oleum. This tower was maintained at a temperature from 60° C. to 80° C. Upon leaving the tower, the gases were passed through an asbestos filter which removed all of the addition compound of nitrogen oxides and sulfuric anhydride and most of the sulfuric anhydride mist which was carried over. After leaving the asbestos filter, the gas was washed with 98 per cent sulfuric acid to remove the remaining sulfuric anhydride mist. The gas was analyzed for nitric oxide content both before and after treatment. Typical examples selected from a large number of runs are set forth in the following table:

Table I

| Volume in cu. ft. gas treated | Mg. of NO per cu. ft. before treatment | Mg. of NO per cu. ft. after treatment |
|---|---|---|
| 12.7 | 0.045 | 0.000 |
| 15.0 | 0.135 | 0.000 |
| 13.6 | 0.230 | 0.000 |
| 14.5 | 0.510 | 0.000 |
| 15.0 | 0.860 | 0.000 |
| 14.7 | 1.13 | 0.000 |

EXAMPLE II

The procedure of Example I was carried out upon stack gases from an oil-fired steam boiler. Before treating the gas as set forth in Example I, it was passed through a dry smoke filter to remove unburned carbon and ash. Fifty per cent (50%) sulfuric acid was used in the second column to remove the residual anhydride mist. Table II shows typical results obtained on this type of gas.

Table II

| Volume in cu. ft. gas treated | Mg. of NO per cu. ft. before treatment | Mg. of NO per cu. ft. after treatment |
|---|---|---|
| 10.2 | 3.24 | 0.000 |
| 9.6 | .71 | 0.000 |

While the invention has been explained in its preferred embodiments, it is not essential that the exact type of apparatus be used and the exact procedure of examples be followed. The essential features of the invention are that the gas to be purified should come into contact with a source of sulfuric anhydride so as to form the compound $(SO_3)_2NO$, and then filtered by a suitable filter to remove this solid in the gas stream.

The source of sulfuric anhydride is, most conveniently, fuming sulfuric acid or oleum. In general, from 20 per cent to 60 per cent free sulfuric anhydride in the oleum has been used with equal success. The temperature of the oleum in the examples was between 60° C. and 80° C. However, other temperatures may be satisfactorily used. In fact, the only disadvantages of lower temperatures is that the gases must be cooled and longer contact time is necessary and, hence, larger equipment is needed. Higher temperatures may be used up to the melting point of the addition product, but such higher temperatures do not produce material advantages, and, hence, are not preferred.

It will be readily apparent to those skilled in the art that other types of contact apparatus may be used and that other filter materials than asbestos may be used to remove the solid materials from the gas. As has been explained, the filter which removes the solid addition product will not generally remove all of the sulfuric anhydride mist, and, hence, in the preferred form of the invention, the gas is passed through a second tower to remove the residual sulfuric anhydride mist.

In the examples, 98 per cent sulfuric acid and 50 per cent sulfuric acid were used in this second tower. However, other experiments show that plain water will function satisfactorily, and, hence, the composition of the aqueous sulfuric acid in the wash tower can be from 0 to 98 per cent.

The removal of nitrogen oxides from gas streams and particularly from combustion gases by the present process has the particular advantage that the process may be carried on continually over a long period of time without shutting down to renew the absorption media of the filter and, at the same time, producing a gaseous product entirely free of the undesired product. The removal of the impurity as a solid enables this use of the same material as a filter for a long time without decreased efficiency. An additional advantage lies in the fact that the adsorption of nitrogen oxide upon charcoal or similar media, gas rises to a condition leading to explosions, whereas the conversion of the oxides of nitrogen to a solid compound entirely avoids this hazard. Where the process of the present invention is used upon combustion gases, it produces inert gas streams free of nitrogen oxides and free of small particles of the adsorption mass of the prior art which were frequently carried into the gas stream. Such atmosphere is quite useful in the plastic and paint departments in the manufacture of pigments and plastic products, which would be decomposed or discolored by the presence of nitrogen oxides. The invention also provides a method for making sulfuric acid free from nitric acid as an impurity.

It is apparent that many widely different embodiments of this invention may be made without departing from the spirit and scope thereof, and, therefore, it is not intended to be limited except as indicated in the appended claims.

I claim:

1. A process for removing nitrogen oxides from gases containing the same which comprises forming a solid addition compound of sulfuric anhydride and nitric oxide by passing said gases into contact with sulfuric anhydride, and removing the solid addition compound by passing the gas stream through a filter.

2. A process for removing nitrogen oxide from combustion gases containing the same which comprises forming solid $(SO_3)_2NO$ by passing said gases into contact with fuming sulfuric acid containing about from 20 to 60 per cent free $SO_3$, and removing the $(SO_3)_2NO$ and most of the entrained $SO_3$ by passing the gas stream through a filter.

3. A process for removing nitrogen oxide from combustion gases containing the same which comprises forming solid $(SO_3)_2NO$ by passing said gases into contact with fuming sulfuric acid containing about from 20 to 60 per cent free $SO_3$, removing the $(SO_3)_2NO$ and most of the entrained $SO_3$ by passing the gas stream through an asbestos filter, and then removing the residual entrained $SO_3$ by passing the gas stream into contact with an aqueous medium containing from 0 to 98 per cent sulfuric acid.

4. A process for removing nitrogen oxide from combustion gases containing the same which comprises forming solid $(SO_3)_2NO$ by passing said gases into contact with a fuming sulfuric acid mist containing about from 20 to 60 per cent free $SO_3$ maintained at a temperature of about 60° C. to 80° C., removing the $(SO_3)_2NO$ and most of the entrained $SO_3$ by passing the gas stream through an asbestos filter, and then removing the residual entrained $SO_3$ by passing the gas stream into contact with an aqueous medium containing from 0 to 98 per cent sulfuric acid.

LOUIS JOSEPH MARCOTTE.